Figure 1:
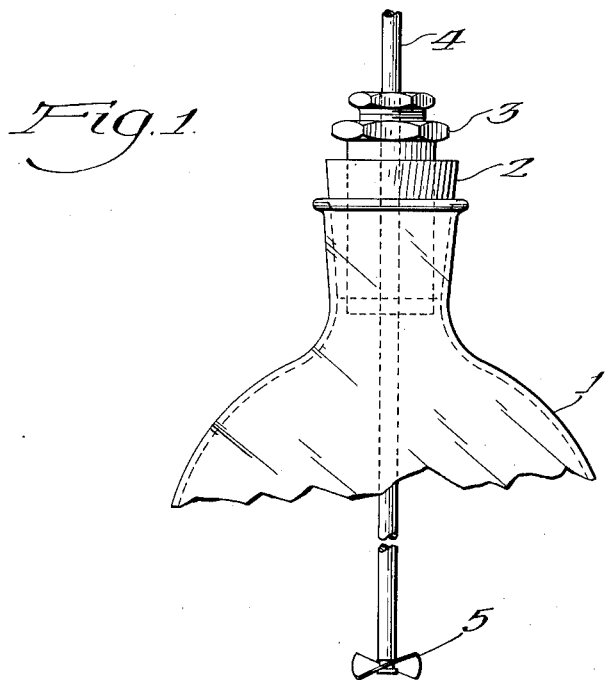

Dec. 23, 1952

C. WANKAT ET AL 2,622,943

BEARING AND SEAL DEVICE FOR STIRRER SHAFTS

Filed Feb. 23, 1949

INVENTORS:
Charles Wankat
Frederick J. Gervais
BY M. P. Venema
Attorney
Philip J. Sizzett
Agent Patented Dec. 23, 1952

2,622,943

UNITED STATES PATENT OFFICE 2,622,943

BEARING AND SEAL DEVICE FOR STIRRER SHAFTS

Charles Wankat, Brookfield, and Frederick J. Gervais, La Grange, Ill., assignors to Universal Oil Products Company, Chicago, Ill., a corporation of Delaware Application February 23, 1949, Serial No. 77,846

4 Claims. (Cl. 308—36.3)

This invention relates to an improved type of bearing and seal device for rotating stirrer shafts such as utilized in connection with small containers, laboratory flasks, or the like.

The present device or apparatus is constructed in a manner to be placed within a bored cork, stopper, or other closure member of a removable type, and is of particular advantage as compared with other types of bearings and sealing devices in that some misalignment is allowable between the closure and the rotating shaft extending into the particular container. In laboratory operations, it is frequently desirable to stir and mix fluid materials or reactants within a flask or other similar container by a mechanically driven shaft having a stirrer or mixing blade. Portable motors with removable shafts and interchangeable types of blades or stirrers are normally utilized to carry out various mixing operations in a rapid and efficient manner. Where the motors and stirring shafts are used in beakers and open vessels, there is no necessity of a bearing or seal around the shaft; however, when it is desired to stir or mix materials in an enclosed flask or vessel, to prevent splashing of materials or the escape of vapors, then a bearing and seal device through the closure to the vessel, such as the improved device of this invention, is of particular advantage.

Many of the present types of sealing devices utilized in connection with stirrer shafts, such as the glass mercury seals used around stirrer shafts, are in general, unsatisfactory, in that glass does not provide a suitable bearing surface for the shaft, and even slight misalignments between the stirrer shaft and the seal member are sufficient to greatly reduce the rate of stirring or may even cause complete stoppage of the stirrer. In addition, there is always danger of breaking the glass retaining cup and allowing the mercury to flow into the flask or other vessel.

It is an object of the present invention to provide a bearing and seal apparatus for a stirrer which is suitable for mounting in a cork or other closure to a small container, laboratory flask, or the like, into which the stirring member extends.

It is also an object of the present invention to provide a bearing and seal device having a ball and socket, or swivel construction, permitting a small amount of misalignment between the stirrer shaft and the body of the device or closure.

It is a still further object of the invention to provide a device having removable parts and means permitting relatively easy assembly of the device for replacement purposes or internal lubrication, such that the stirrer shaft passing through the bearing portion of the device may be adequately lubricated for high speed operation.

Briefly, a simplified embodiment of the improved bearing and seal device for stirrer shafts in accordance with the present invention, comprises in combination, a tubular body member suitable for positioning in a removable closure member to a container, the body member having an open passage-way therethrough, with one end of the passage-way threaded and the other end thereof narrowing and forming an internal offset or seat, a tubular bearing member having an internal cylindrical bearing surface suitable to accommodate the stirrer shaft and a spherical external portion adapted to rest within the seat formed within the passage-way, a compression spring adapted for positioning within the body member and holding the bearing member firmly against the internal seat, and a retaining ring or bushing attached to the body member at the end of the passageway, in a manner holding the compression spring and bearing member within the passageway of the tubular body member.

The tubular body member may have a cylindrical external surface such that it may be inserted in a bored cork or the like, which in turn provides the closure or stopper for a flask or other vessel. However, the external shape may be other than cylindrical and may be mounted in various types of closures adapted to other forms of mixing containers.

In a preferred embodiment, the bearing member which is positioned within the passageway of the tubular body member, has one or more holes or perforations through its wall, such that a lubricant placed within the passageway may flow through the wall of the bearing member and into the bearing surface to contact the rotating stirrer shaft. Also, the retaining ring or bushing is preferably threaded externally and the outer end of the passageway tapped to accommodate the bushing, so that the latter may be threadedly attached to the body member.

The construction of the improved device of this invention, as well as additional advantages of this bearing and seal device for laboratory stirrer shafts, will be more apparent upon reference to the accompanying drawing and the following description thereof.

Figure 1 of the drawing illustrates the bearing and sealing device of the present invention positioned in a bored stopper or cork and mounted in a flask such as may be used in a chemical laboratory.

Figure 2:
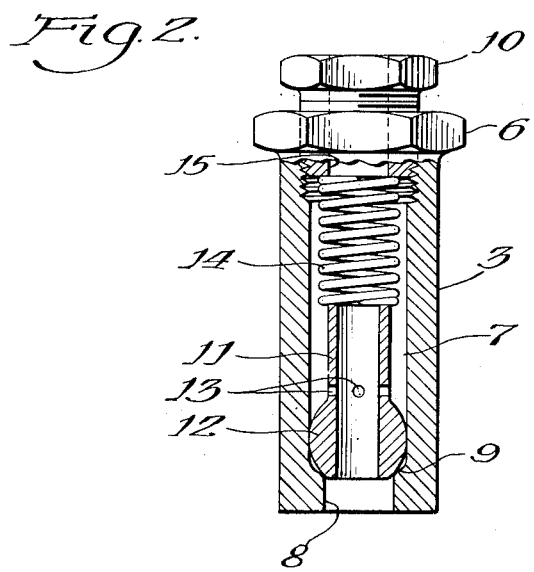

Figure 2 of the drawing is a sectional view through the improved bearing seal device, showing the separate parts and their assembly to form the apparatus.

In Figure 1 of the drawing, there is shown a flask 1 having a bored cork or rubber stopper 2, which in turn holds the tubular body member 3 of the device. The internal parts of the device are not shown in this view, however, a typical stirrer shaft 4 is illustrated as passing through the bearing and seal device, with the lower end of the shaft 4 having a propeller or mixing blade 5 suitable to stir and mix liquids which may be placed within the flask 1. Normally, the stirrer shaft is removable from the driving motor, being connected to the latter by means of a collar or chuck. Thus, to use the device, the stirrer shaft is removed from the motor and inserted through the bearing and closure member from the inside face of the latter, which in this instance, would be the lower end projecting into the neck of the flask. After the stirrer shaft is passed through the bearing and the closure or stopper 2 is replaced within the neck of the flask, the upper end of the shaft is then connected with the stirrer motor (which is not shown in this drawing but is normally mounted over the flask by a suitable supporting stand).

Referring now to Figure 2 of the drawing, there is shown the tubular body member 3, having in this embodiment a hexagon head 6, suitable to aid in turning the body member into the closure member. In some cases, it may be desirable to thread the external wall of the tubular body member 3 for positioning in closure members of types other than a bored cork or stopper. The body member 3 has a passageway 7 therethrough which at its lower end narrows or off-sets to a smaller diameter portion 8 and provides thereby a seat portion 9. The upper portion of the passageway 7 is tapped or threaded to accommodate a bushing or retaining nut or collar 10.

Within the lower portion of the passageway of the tubular body member 3, there is positioned a tubular bearing member 11 having an internal cylindrical bearing surface, which is suitable to accommodate a stirrer shaft in a snug free-running fit, and has a spherical external portion 12, which is of a diameter suitable to slide into the passageway of the tubular body member 3 and rest against the seat 9 in the lower portion of the passageway 7. A preferred embodiment of the present device also has holes 13 provided in the wall of the tubular bearing member 11 such that a fiber grease or other lubricant be permitted to flow onto the bearing surface of the member 11 and onto the surface of the stirrer shaft. When the device is assembled, a suitable packing or fiber grease may be placed between the internal wall or passageway and the external wall of the bearing member 11. It may be seen that the spherical portion 12 of the bearing member provides a swivel or ball and socket engagement with the seat 9, such that a stirrer shaft passing through the bearing member 11 can be somewhat out of alignment with respect to the tubular body member itself, or to the closure member in which the device is mounted to the container.

A suitable compression spring 14 is mounted within the passageway of the body member 3 and bears against the upper end of the bearing member 11 so that the latter is held firmly in place against the lower seat 9. The bushing or retaining nut 10 in turn holds the compression spring 14 as well as the bearing member 11 in place within the passageway of the housing 3. The bushing 10 is threaded externally and engages the internal threading at the upper end of the passageway 7 such that the internal parts may be readily inserted or removed from the body member 3. An opening or passageway 15 also extends through the length of the bushing 10, such that the stirrer shaft may readily pass therethrough and into the bearing member 11.

It should also be noted, however, that the passageways through the bushing 10, the compression spring 14, and the lower passageway 8, at the end of the body member 3, are substantially larger than that of the bearing surface within member 11, as well as larger than the diameter of the stirrer shaft, such that the latter may readily pass through the device and not come in contact with the passageway walls, even though out of alignment slightly with respect to the tubular member 3.

It is a particular advantageous feature of the present invention to provide an assembly permitting the stirrer shaft and the bearing member, or bearing surface, to swivel within the housing and permit the shaft to be somewhat out of alignment with respect to the closure, or the mixing flask or container into which the stirrer shaft projects. The amount of the ball and socket motion may be limited by the tubular member 11 and the inner wall of the tubular body member 3. In the present embodiment, it may be noted that the upper portion of the bearing member 11 is elongated and is of smaller diameter than the passageway in the body member, such that the space between the inner wall of the latter and the external wall of the bearing member 11 permits a certain amount of movement laterally, in a motion that pivots or swivels from the lower spherical portion of the bearing number 12. The extent of this lateral motion, or angular misalignment of the stirrer shaft, may be limited by the space allowed between the bearing member and the body member, or alternately by the length of the bearing member 11, for the longer the member the smaller the angular movement will be. It should also be noted, of course, that the opening within the bushing 10 and that of the lower passageway 8 are sufficiently large that misalignment between the shaft and the body of the device, as permitted by the angular movement of the bearing member 11, does not effect a binding of the stirrer shaft at one end or the other of the device.

It is, of course, not intended to limit the present device to one which would be mounted in a bored cork as indicated in Figure 1 of the drawing, for as has been noted, the device may be mounted in other types of closure members. However, the improved device is, in general, limited to use with relatively small shafts such as stirrer and mixing shafts utilized in a laboratory or with relatively small mixing equipment. Also, the preferred embodiment of the improved device shows a threaded bushing 10 as the means for removably retaining the compression spring and tubular bearing member within the tubular housing or body member 3. This construction has the advantageous feature of permitting removal of the internal parts of the apparatus for replacement when necessary, or for packing grease around the bearing member. However, the retaining member 10 may be clamped, bolted, or otherwise attached to the body member 3 and need not be limited to a threaded engagement with the upper portion of the passageway 7. In other words, minor variations in the construction of the device are possible within the scope of the present invention without departing from the advantageous features of the device which provides a bearing and sealing device for rotating shafts, which permits some misalignment of the shaft, and a high speed shaft, as well as a construction which is not readily worn or broken, as many previous forms of seal and bearing members.

We claim as our invention:

1. A bearing and sealing device of the class described, comprising in combination, a tubular body member having a passageway therethrough, with one end of said passageway narrowing and forming an internal seat therein, a tubular bearing member having an internal cylindrical bearing surface and a spherical external portion adapted for positioning within said passageway against said internal seat, said bearing member having an elongated cylindrical portion of smaller diameter than said passageway, a compression spring adapted for positioning in said passageway of said tubular body member and contacting said bearing member, a retaining collar positioned in said passageway of said tubular body member and removably attached to the latter, whereby to retain said spring and said bearing member within said passageway, and said bearing member being provided with perforations to permit the flow of a lubricant from said passageway of the body member into said bearing surface of said bearing member.

2. A bearing and seal device for a rotating stirrer shaft extending through a closure and into a mixing container, comprising in combination, a tubular body member suitable for mounting within the closure of said container, said tubular body member having a passageway therethrough with one end threaded and the opposite end narrowing and forming an internal seat, a tubular bearing member having an inner cylindrical bearing surface extending therethrough for said rotating shaft passing into said container, said tubular bearing member having an elongated cylindrical portion smaller in diameter than the internal portion of said passageway in the tubular body member, whereby the lateral motion of said bearing member in said passageway is limited, a spherical external portion on said bearing member adapted to pivotally rest within said passageway against said internal seat, a compression spring positioned within said tubular body member against said bearing member, an externally threaded bushing engaging said threaded end of said passageway, said bushing retaining said spring and said bearing member within said passageway through said tubular body member, with free passageways through said compression spring and said bushing of substantially larger diameter than said shaft passing through said tubular bearing member whereby said shaft may be out of alignment with said body member, and said bearing member being provided with perforations to permit the flow of a lubricant from said passageway of the body member into said bearing surface of said bearing member.

3. A bearing and sealing device comprising a tubular body member provided with a longitudinal passageway therethrough and having an internal seat at one end thereof, a tubular bearing member within and having an elongated cylindrical portion of smaller diameter than said passageway, said bearing member having a spherical external portion adapted to engage said seat and an internal cylindrical bearing surface extending through said spherical portion and said cylindrical portion, said spherical portion being formed on the outer wall of said bearing member at one end thereof, a compression spring in said passageway and engaging the opposite end of said bearing member, and a removable collar for retaining said spring and bearing member within said passageway.

4. The device of claim 3 further characterized in that said bearing member is provided with perforations to permit the flow of a lubricant from said passageway into said bearing surface of the bearing member.

CHARLES WANKAT.
FREDERICK J. GERVAIS.

REFERENCES CITED

The following references are of record in the file of this patent:

UNITED STATES PATENTS

| Number | Name | Date |
|---|---|---|
| 343,769 | Levi | June 15, 1886 |
| 989,342 | Doering | Apr. 11, 1911 |
| 1,025,884 | Schmitt | May 7, 1912 |
| 1,109,625 | Cooper | Sept. 1, 1914 |
| 1,156,063 | Daniel | Oct. 12, 1915 |
| 2,126,696 | Bates | Aug. 16, 1938 |